Patented Dec. 5, 1922.

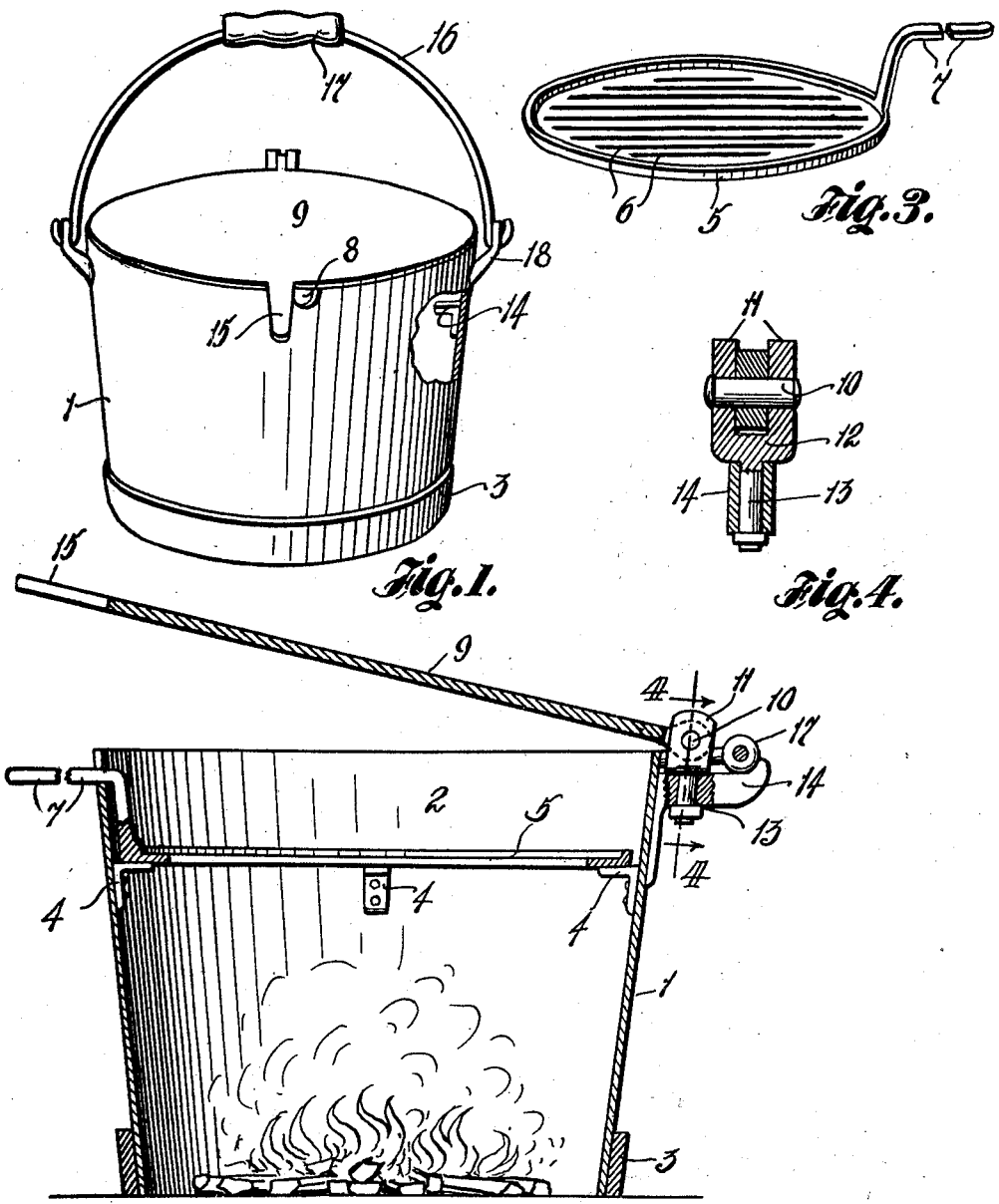

1,437,739

UNITED STATES PATENT OFFICE.

LOUIS A. VERNON, OF DALLAS, TEXAS.

COMBINATION BROILER AND GRIDDLE.

Application filed October 12, 1921. Serial No. 507,270.

*To all whom it may concern:*

Be it known that I, LOUIS A. VERNON, a citizen of the United States, residing at Dallas, in the county of Dallas and State of Texas, have invented certain new and useful Improvements in Combination Broilers and Griddles, of which the following is a specification.

This invention relates to improvements in griddles and broilers and has for one of its objects the provision of a combined griddle and broiler to be set over an opening in a wood or coal stove or may be used on a gas range, for cooking griddle cakes, broiling meats, baking bread and the like.

Another particular object of the invention is to provide a device of this nature which may be used in camping and having provision for placing the broiler and griddle directly over a camp fire or bed of coals, the device being strongly constructed and not of expensive manufacture.

The invention will be more fully understood by reference to the following description, taken in connection with the accompanying drawings, forming part hereof, in which—

Figure 1 is a perspective view of the invention with part broken away to show the interior, the broiler plate removed and the griddle plate shown in operative position.

Figure 2 is a vertical sectional view of the device in position over a camp fire or bed of coals, with the broiler plate in operative position.

Figure 3 is a perspective view of the broiler plate removed from the body of the device, and Figure 4 is a cross sectional view of the hinged and pivoted connection of the griddle plate with the body of the device.

Referring more particularly to the drawings, 1 denotes the body of the device which may be made of any suitable metal and as depicted in the drawing is open at the bottom, the sides diverging upwardly and providing a top opening 2. The bottom or lower end of the body 1 has a collar or band 3 affixed thereto in any preferred manner to give balance and prevent the upper portion from being top-heavy.

A plurality of supporting brackets 4—4 are secured to the inside walls of the body 1, a short distance from the top edges, as shown in Figure 2, for the purpose of supporting a broiler plate 5, illustrated in Figure 3. The broiler plate is ribbed at 6—6 and has an upwardly and outwardly extended handle 7 which projects through a notch 8 in the body 1 when the broiler plate is in position over a fire. The broiler plate is for the purpose of broiling or cooking meats and the like and may be used in baking bread.

A griddle plate 9 for cooking griddle cakes is hingedly connected by pin 10 between the upper prongs 11—11 of a member 12. This member 12 has its lower portion formed into a spindle 13 which is passed through an aperture in a projection 14 affixed to or made a part of the body 1. In this manner the griddle plate 9 may be lifted upward by its handle 15 or swung around out of the way without being lifted from the horizontal when the broiler plate 5 is in use.

The device is provided with a bail 16, handle 17 and eyed projections 18 and the handle 17, when not in use, is supported upon the member 15 to prevent it from becoming hot.

In Figure 2 the device is shown in use over a camp fire, or fire or bed of coals in the open, but when in use upon a stove the stove covering or lid over one of the openings or stove holes is removed and the collar 3 and lower edges of the body 1 will project sufficiently beyond the edge of the stove hole to close the opening and allow the heat to pass upward to the broiler plate or griddle plate.

What is claimed is—

A combined portable broiler and griddle having a cylindrical, substantially frusto-conical shaped hollow member open at top and bottom, a closure for the top opening comprising a griddle, said griddle hingedly connected to the hollow member and adapted to be swung vertically and horizontally with respect thereto; a detachable broiler plate with a handle projecting through the hollow member; means within the hollow member for supporting the broiler plate therein, and a band around the lower end of the hollow member to equalize the weight and to form an abutment and support.

In testimony whereof I have signed my name to this specification.

LOUIS A. VERNON.